United States Patent [19]

Nakano et al.

[11] 4,309,587
[45] Jan. 5, 1982

[54] HORIZONTAL ELECTRO-SLAG WELDING PROCESS FOR SURFACING

[75] Inventors: Shosaburo Nakano, Mobara; Toshiharu Hiro, Chiba; Noboru Nishiyama, Ichihara; Kazuo Agusa; Masaaki Kosho, both of Chiba, all of Japan

[73] Assignee: Kawasaki Steel Corporation, Kobe, Japan

[21] Appl. No.: 122,875

[22] Filed: Feb. 20, 1980

[30] Foreign Application Priority Data

Apr. 13, 1979 [JP] Japan .................................. 54-44178

[51] Int. Cl.³ .............................................. B23K 9/04
[52] U.S. Cl. ................................. 219/73.11; 219/123; 219/128
[58] Field of Search ...................... 219/123, 128, 73.11

[56] References Cited

U.S. PATENT DOCUMENTS

| | | | |
|---|---|---|---|
| 3,584,181 | 6/1971 | Nemoto | 219/123 X |
| 3,882,298 | 5/1975 | Neff | 219/123 X |
| 4,027,135 | 5/1977 | Barger | 219/123 X |
| 4,190,760 | 2/1980 | Kano | 219/123 X |

*Primary Examiner*—Elliot A. Goldberg
*Attorney, Agent, or Firm*—Balogh, Osann, Kramer, Dvorak, Genova & Traub

[57] ABSTRACT

Surfacing is conducted with horizontal electro-slag welding by using a strip electrode, and by applying a magnetic field, having component perpendicular to a base metal, to a molten metal and slag pool to control the flow of the molten pool.

3 Claims, 24 Drawing Figures

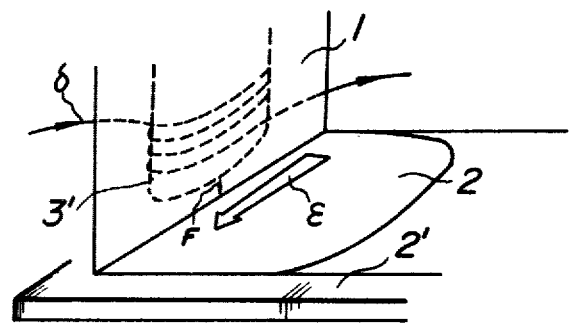
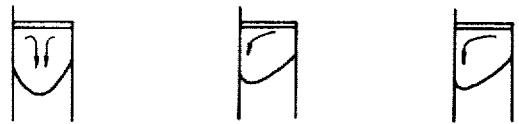

FIG.5d  FIG.5e  FIG.5f
  
FIG.6a  FIG.6b  FIG.6c
  
FIG.6d  FIG.6e  FIG.6f
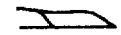 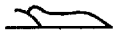 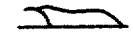

HORIZONTAL ELECTRO-SLAG WELDING PROCESS FOR SURFACING

The present invention relates to horizontal electro-slag welding process for surfacing and particularly an improvement of an over-lay welding process for obtaining a flat surface at the overlap area adjacent two weld passes.

Surfacing with electro-slag welding process is superior to that with submerged arc welding process in view of the smaller dilution of base metal and stable welding phenomena.

However, when a large direct current is used, since the viscosity of the slag to be used is low, an irregular flow is apt to be caused owing to the function of electromagnetic field caused by the welding current and by the other complicated reasons, and as a result, defects of undercut and the like are apt to be caused.

Figure 1A:
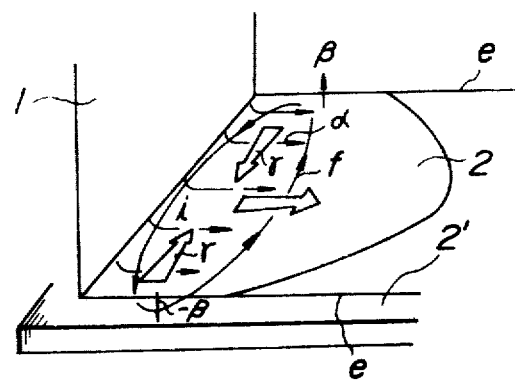
Figure 1B:
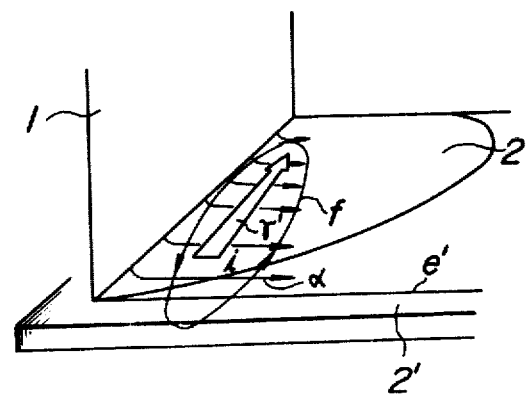

FIG. 1 is a view for explaining the cause of forming undercuts. FIG. 1, (a) shows the case where the current distributes uniformly in the width direction of a strip electrode 1 and FIG. 1, (b) shows the case where the current shifts and flows to one side of the strip electrode 1. When the current i flows uniformly as shown by arrow marks, an upward magnetic field acts at the right end (toward the advance direction of the electrode) of the molten pool 2 as shown by an arrow-$\beta$, and a downward magnetic field acts at the left end as shown by an arrow-$\beta$, and by the interaction between these magnetic fields and the welding current i flowing in the molten metal and slag, Lorentz force is generated and forces molten metal and slag in the vicinity of the strip electrode 1 to flow inwardly toward the center portion as shown by white arrows $\gamma$. Accordingly, molten metal at both ends of the molten pool 2 becomes deficient and undercuts are formed at the bead edges e. When the current distribution shifts and flows, as shown in FIG. 1, (b), the molten metal and slag flow mainly toward one direction as shown by a white arrow $\gamma'$ and an undercut is formed at one side e' of the molten pool 2. In FIG. 1, a numeral 2' is a base metal and a letter f is a magnetic flux. When a large number of beads are welded in parallel in turn, a large cost for repairing of the undercuts is necessary.

The inventors have found that such undercuts can be completely prevented by controlling the direction and the rate of molten slag and metal flow in the molten pool.

That is, by applying the magnetic field having a component perpendicular to the base metal to the molten pool 2, Lorentz force for control of molten slag and metal flow is generated by the interaction between this field and the welding current.

Figure 2:
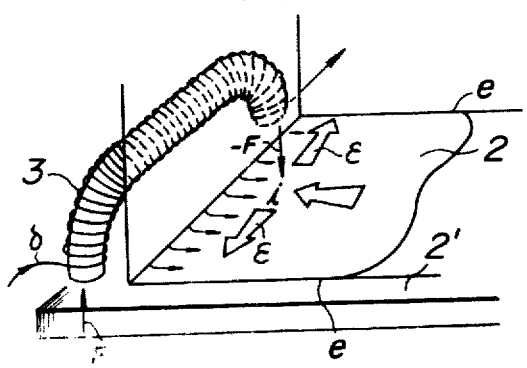

Referring to FIG. 2, by passing a direct current toward an arrow direction $\delta$ through coil 3, an upward magnetic field F is generated at the left end portion of the coil 3 and a downward magnetic field $-F$ is generated at the right end portion. Interaction between these magnetic fields and the welding current i intersecting at right angle to these magnetic fields causes force following to Fleming's left-hand rule, which causes the outward flows as shown by white arrows $\epsilon$ toward both sides of the molten pool 2, that is toward the bead edges e and e from the center portion of the strip electrode 1.

Figure 7:
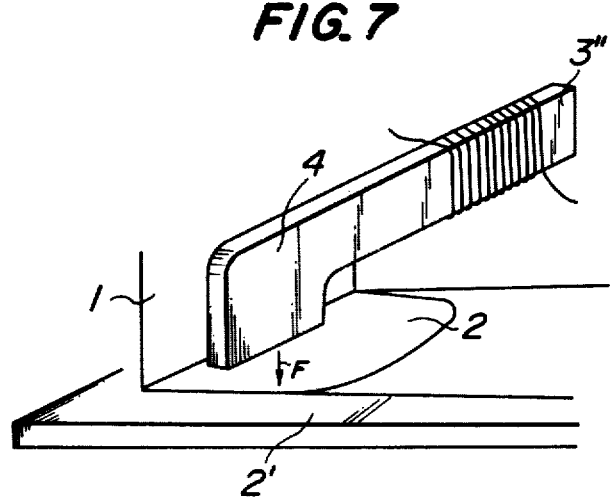
Figure 8:
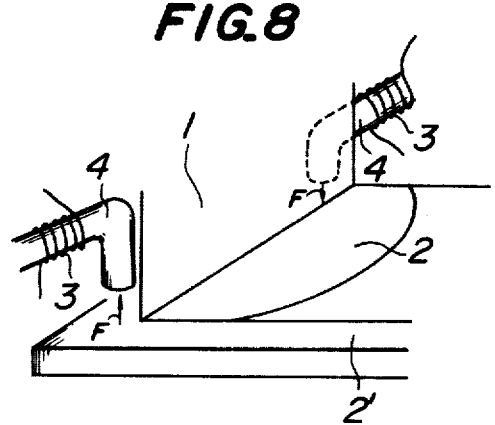

For better understanding of the invention, reference is taken to the accompanying drawings, wherein:

FIG. 1, (a) and (d) are schematic views for explaining the cause for undercuts formed at the overlapped area of the welded beads;

FIG. 2 is a schematic view showing an example when an austenite stainless steel electrode is used in the electro-slag welding process;

FIG. 3, (a)-(f) are views for explaining the slag flow patterns against the coil current;

FIG. 4 is a schematic view when another example is carried out by using another coil;

FIG. 5, (a)-(f) are views for showing the relation of the slag flows to the coil currents;

FIG. 6, (a)-(f) are views showing the cross-sections of the beads;

FIG. 7 is a schematic view showing an example when a ferrite electrode is used; and FIG. 8 is a schematic view showing an example when independent coils are used.

The invention will be explained in more detail with reference to the following examples.

Over-lay weldings were conducted by using a strip electrode 1 having a width of 150 mm, arranging a coil wound around an iron core in 250 turns at the position as shown in FIG. 2 and passing the various currents as shown in Table 1 through the coil to form two beads, which were overlapped over a width of 8–10 mm, in parallel. The flowing directions of the molten slag are shown in FIG. 3 and the number of the formed undercut is shown in the following Table 1.

TABLE 1

| Coil current (A) | | 0 | 1 | 2 | 5 | 10 | −5 |
|---|---|---|---|---|---|---|---|
| Slag flow (FIG. 3) | | (a) | (b) | (c) | (d) | (e) | (f) |
| Number of undercuts per m of bead | Overlapped area | all the way | 4 | 2 | 0 | 0 | all the way |
| | Base metal side | all the way | 0 | 0 | 0 | 0 | all the way |

Test condition:
Composition of the strip electrode: SUS 309L (JIS)
Welding current: 2,500 A (Reverse polarity)
Voltage: 25 V
Welding rate: 15 cm/min.

Coil current −5 means that the current is passed in the reverse direction to the direction in FIG. 2.

From the above data, when no magnetic field is applied or the magnetic field is applied in the reverse direction, the undercuts are formed along all the way of the overlapped area. When the coil current is 1 A, the strong slag flow toward the center portion of the electrode is not found but local undercuts are formed at the overlapped area.

When the coil current is 5 A, molten slag flows toward the outsides of the molten pool from the center portion of the electrode and the defects are not found. Even if the coil current is increased to 10 A, there is no variation from the case applying low current.

Over-lay welding was conducted by using a strip electrode having a width of 75 mm and arranging a coil 3' wound around an iron core in 460 turns as shown in FIG. 4, and varying the coil current as disclosed in the following Table 2. When the magnetic field is not applied, undercuts are formed locally at both edges of the bead. While, when 0.5 A of coil current is passed, molten metal and slag in the vicinity of the strip electrode flow toward the already formed bead, whereby the formation of the undercut can be prevented. The satisfactory bead is obtained until 2 A. When the coil current becomes 5 A, the slag flow becomes too violent and the center portion of the bead becomes more or less concave, and when the coil current is 10 A, large continuous undercuts are formed at the boundary portion between the bead and the base metal, but in both cases of 5 A and 10 A, no undercut is formed at the overlapped area. The slag flow pattern in these examples is shown in FIG. 5 and the cross-sectional shapes of the beads are shown in FIG. 6 and the obtained data are shown in the following Table 2.

TABLE 2

| Coil current (A) | | 0 | 0.5 | 1 | 2 | 5 | 10 |
|---|---|---|---|---|---|---|---|
| Slag flow (FIG. 5) | | (a) | (b) | (c) | (d) | (e) | (f) |
| Number of undercuts per m of bead | Overlapped area | 3 | 0 | 0 | 0 | 0 | 0 |
| | base metal side | 2 | 0 | 0 | 0 | 0 | all the way |

Test condition:
Composition of the strip electrode: SUS 309L (JIS)
Welding current: 1,250 A (Reverse polarity)
Voltage: 25 V
Welding rate: 15 cm/min.
Bead overlapped width: 5-8 mm In both examples shown in FIG. 2 and FIG. 4, an austenite strip electrode was used and in order to prevent the burning damage of the coils 3 and 3' due to heat irradiation of the molten pool 2, the coils 3 and 3' were arranged in front of the strip electrode 1, but when a ferrite strip electrode is used in such a coil arrangement, it is impossible to apply effectively the magnetic field to the molten pool due to magnetic shield by the ferrite strip. In this case, it is effective to apply the magnetic field from a position just above the molten pool 2 behind the strip electrode 1 by means of a coil 3" composed of an elongated core shown in FIG. 7. Furthermore, even when a strip austenite electrode is used, it is permissible to arrange the above described coil 3" above the molten pool 2.

In the examples above mentioned, the reverse polarity (electrode +, base plate −) was used. In the case of the straight polarity (electrode −, base plate +), the magnetic field should be applied in the contrary directions to those shown in FIGS. 2, 4, 7 and 8 to flow the molten pool in the same direction as in the reverse polarity.

In any one of the above described examples, a single coil is used but the more preferable result can be obtained by arranging plural coils in series and energizing these coils by the same current, or more preferably by plural coils independently as shown in FIG. 8 respectively.

Furthermore, for generating the effective magnetic field, the same effect can be obtained even by using a permanent magnet instead of the above described solenoids, even though the adjustment of strength of magnetic field becomes somewhat difficult.

As the technique for moving the molten metal and slag, a linear motor type which applies the moving magnetic field, may be used but the mechanism becomes somewhat complicated.

Thus, the undercuts at the overlapped area adjacent two beads, which prevail the major part of defects in the horizontal electroslag welding for surfacing, can be completely prevented by arranging a very simple coil on a usual welding machine.

What is claimed is:

1. In a method for surfacing with horizontal electroslag welding by using a strip electrode, the improvement comprising arranging at least one solenoid, magnetized by direct current, adjacent to the strip electrode, and applying magnetic fields, having components perpendicular to a base metal, to both sides of molten pool of metal so that the magnetic fields act in mutually opposite directions at both sides of the molten pool, whereby molten metal flows toward both edges of the pool in the width direction of the electrode.

2. The method as claimed in claim 1, wherein when a strip electrode is made of austenite stainless steel, the solenoid is arranged in front of the strip electrode.

3. The method as claimed in claim 1, wherein when a strip electrode is made of ferrite, the solenoid is arranged above the molten pool.

* * * * *